US007882090B2

(12) United States Patent
Richardson et al.

(10) Patent No.: US 7,882,090 B2
(45) Date of Patent: Feb. 1, 2011

(54) CUSTOMIZING HELP CONTENT (75) Inventors: Cyra Richardson, Bellevue, WA (US); Kynan Antos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 499 days.

(21) Appl. No.: 11/724,059

(22) Filed: Mar. 14, 2007

(65) Prior Publication Data
US 2008/0229199 A1 Sep. 18, 2008

(51) Int. Cl.
G06F 17/30 (2006.01)
(52) U.S. Cl. .................... 707/705; 707/791; 707/793; 707/795; 707/796; 707/802; 715/705; 715/708; 715/714
(58) Field of Classification Search ............ 707/3, 707/104.1, 9, 10, 102, 999.003, 999.009, 707/999.01, 999.102, 999.107, 705, 791, 707/793, 796, 802, 795; 715/705, 708, 714
See application file for complete search history.

(56) References Cited

U.S. PATENT DOCUMENTS

| 5,377,319 | A | | 12/1994 | Kitahara et al. |
| 5,600,779 | A | | 2/1997 | Palmer et al. |
| 5,933,140 | A | | 8/1999 | Strahorn et al. |
| 6,185,587 | B1 | * | 2/2001 | Bernardo et al. ............ 715/234 |
| 6,421,065 | B1 | | 7/2002 | Walden et al. |
| 6,467,080 | B1 | * | 10/2002 | Devine et al. ............... 717/123 |
| 6,587,121 | B1 | | 7/2003 | Nelson et al. |
| 6,687,485 | B2 | * | 2/2004 | Hopkins et al. ............ 434/350 |
| 6,825,941 | B1 | * | 11/2004 | Nguyen et al. ............ 358/1.15 |
| 6,850,259 | B1 | | 2/2005 | Rzepkowski et al. |
| 7,047,498 | B2 | | 5/2006 | Lui et al. |
| 7,086,009 | B2 | * | 8/2006 | Resnick et al. ............. 715/771 |
| 7,133,162 | B2 | | 11/2006 | Dow et al. |
| 7,167,863 | B2 | * | 1/2007 | Ellis et al. ..................... 707/10 |
| 7,325,015 | B2 | * | 1/2008 | Zhou et al. ............... 707/104.1 |
| 2002/0054138 | A1 | | 5/2002 | Hennum |
| 2003/0058267 | A1 | * | 3/2003 | Warren ..................... 345/705 |
| 2003/0101165 | A1 | * | 5/2003 | Warren ........................ 707/1 |
| 2003/0219707 | A1 | * | 11/2003 | Hopkins et al. ............ 434/350 |
| 2003/0229608 | A1 | * | 12/2003 | Reynar et al. ................ 707/1 |

(Continued)

OTHER PUBLICATIONS

"Demo: Set up a OneNote notebook", http://office.microsoft.com/en-us/onenote/HA101860111033.aspx?pid=CH100740841033.

(Continued)

*Primary Examiner*—Don Wong
*Assistant Examiner*—Thanh-Ha Dang
(74) *Attorney, Agent, or Firm*—Krajec Patent Offices, LLC; Russell S. Krajec (57) ABSTRACT A method for providing customized help, the method comprising: retrieving a first help content from a first help datastore in response to a help request received from a user, the first help datastore storing a plurality of help content each associated with a respective help identifier; retrieving a second help content from a second help datastore, the second help datastore storing a plurality of help content each associated with a respective help identifier, the second help content having the same help identifier as the first help content; generating a help presentation file comprising the first help content and the second help content; wherein one the first help datastore or the second help datastore is editable by the user and the other help datastore is non-editable by the user.

12 Claims, 6 Drawing Sheets

U.S. PATENT DOCUMENTS

| | | | |
|---|---|---|---|
| 2004/0036715 A1* | 2/2004 | Warren | 345/713 |
| 2004/0044585 A1 | 3/2004 | Franco | |
| 2004/0095480 A1 | 5/2004 | Battles et al. | |
| 2004/0143667 A1* | 7/2004 | Jerome | 709/228 |
| 2004/0157202 A1* | 8/2004 | Hopkins et al. | 434/350 |
| 2004/0187082 A1* | 9/2004 | Hathaway | 715/531 |
| 2005/0015357 A1* | 1/2005 | Shahidi | 707/1 |
| 2005/0042593 A1* | 2/2005 | Hopkins et al. | 434/350 |
| 2005/0154719 A1* | 7/2005 | Choudhary et al. | 707/3 |
| 2005/0166148 A1 | 7/2005 | Garding | |
| 2006/0085750 A1* | 4/2006 | Easton et al. | 715/708 |
| 2007/0156648 A1* | 7/2007 | Bridges et al. | 707/3 |
| 2007/0239760 A1* | 10/2007 | Simon | 707/102 |
| 2008/0250054 A1* | 10/2008 | Nickel | 707/102 |

OTHER PUBLICATIONS

Denoue et al., "An annotation tool for Web browsers and its applications to information retrieval", http://www.fxpa I.com/people/denoue/publications/riao2000.pdf.

Kurhila et al., "Joint Annotation and Knowledge Building in Collaborative E-Learning", http://cosco.hiit.fi/edutech/publications/elearn2003.pdf.

Wilcox et al., "Dynomite: A Dynamically Organized Ink and Audio Notebook", Date: Mar. 1997, http://delivery.acm.org/10.1145/260000/258700/p186-wilcox.pdf?key1=2587008key2=0559174611&coll=GUIDE&dl=GUIDE&CFID=7369608&CFTOKEN=65075986.

Wright, Jon, "E-Notebook Breaking the Paper Chains-A research fellow moves from paper to electronics with E-Notebook", http://chemnews.cambridgesoft.com/art.cfm?S=360.

* cited by examiner

CUSTOMIZING HELP CONTENT

BACKGROUND

Providing assistance for users of software products such as user productivity applications or administrator network configuration tools typically comprises displaying static help content from a local help file or online webpage server in response to user help requests. The help content is typically organized as a number of pages arranged into a navigable tree structure, for example including broad help topics at a high level and more detailed help content relating to those topics at a lower level in the tree structure. A user may then navigate though this help content tree structure in order to identify and browse the most relevant content for their current assistance needs.

More recent user assistance or help products provide dynamically updated help content and allow users to search the help content based on keywords for example. Some help products also integrate with the software product for which help is being provided in order to automatically display help content appropriate to the user's current situation within the software product. For example when a user is currently in the "Enter Bill" module of a user accounting application, a user request for help may automatically display a help page related to the "Enter Bills" module, rather than a high level topics page.

SUMMARY

The following presents a simplified summary of one or more aspects of the disclosure in order to provide a basic understanding to the reader. This summary is not intended to delineate the scope of protection sought in the claims, nor to identify essential features. Its purpose is to present some concepts disclosed herein in a simplified form in order to introduce them to the reader.

A method for providing customized help including retrieving first help content from a first help datastore in response to a help request received from a user. The first help datastore stores a plurality of help content each associated with a respective help identifier. Retrieving second help content from a second help datastore. The second help datastore storing a plurality of help content each associated with a respective help identifier, the retrieved second help content having the same help identifier as the retrieved first help content. Generating a help presentation file comprising the first help content and the second help content. One of the first help datastore or the second help datastore is editable by the user and the other help datastore is non-editable by the user.

In an embodiment, the first help content or the second help content is non-editable predetermined help content and the other help content (second or first help content) is editable user notebook entries.

BRIEF DESCRIPTION OF THE DRAWINGS

Embodiments will now be described with reference to the following drawings, by way of example only and without intending to be limiting, in which.

DETAILED DESCRIPTION

Figure 1:
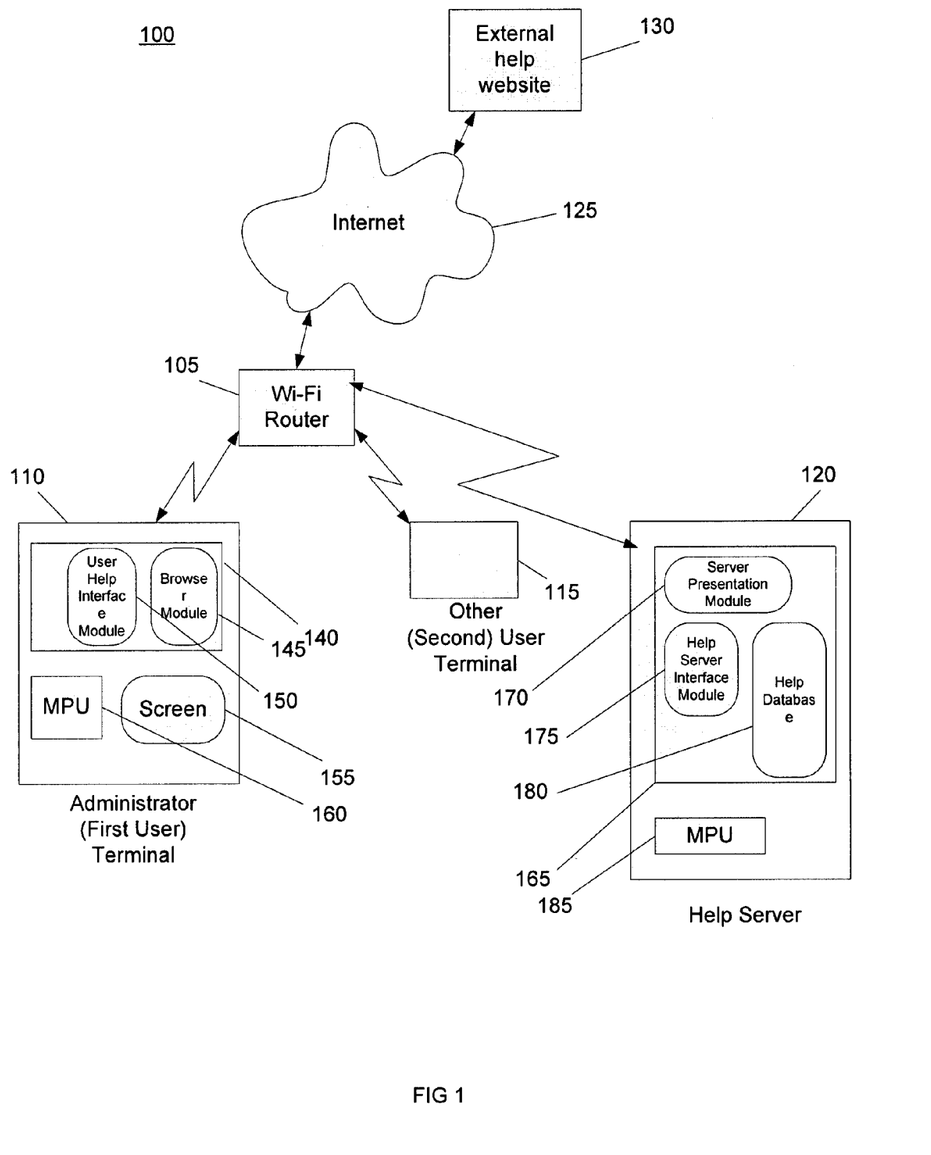
FIG. 1 is a schematic of an operating environment for an embodiment.

FIG. 1 illustrates an example operating environment or system 100 according to an embodiment. However it will be appreciated that various other operating environments could alternatively be used. The system 100 comprises a wireless local area network (WLAN) router 105 such as a Wi-Fi router, a first user's terminal 110, typically an administrator's terminal such as a personal computer (PC) or Internet Appliance, one or more second or other user terminals 115, a help server 120, the Internet 125 and an external help website 130. The WLAN router 105 is coupled wirelessly to the first and second user terminals 110, 115 and the help server 120 to form a local WLAN. The WLAN router 105 is also coupled to the external help website 130 via a connection to the Internet 125. In this embodiment the administrators terminal 110 and is used by an administrator of the WLAN (105, 110, 115, 120) to setup and configure the WLAN.

The administrators terminal 110 comprises a display screen 155, a processor 160 which may include one or more of a general purpose microprocessor units (MPU), a specific purpose digital signal processor (DSP) or application specific integrated circuit (ASIC), a programmable logic gate array, and memory 140 which may comprise one or more of RAM or working memory, ROM and storage memory such as a hard disk drive. The processor 160 and memory 140 are used to implement and store various software modules or computer programs as is known in order to provide various functionality to a user of the administrator's terminal 110. The administrator's terminal 110 will typically include a Web Browser module 145 such as MICROSOFT INTERNET EXPLORER, NETSCAPE NAVIGATOR or MOZILLA FIREFOX. The administrator's terminal 110 may also comprises a user help interface module 150 which provides a user interface for customizing help for a user of the first user or administrator's terminal 110.

The Internet 125 and WLAN router 105 may operate in any suitable manner which would be available to those skilled in the art, and are not further described here. The second user or other terminal(s) 115 will typically be similar to the administrator's terminal 110, but may include different software modules, and may not include a help user interface module 150.

The help server 120 comprises a processor 185 and memory 165 operating according to a server operating system such as MICROSOFT WINDOWS NT or APPLE MAC OS X SERVER (RHAPSODY) for example. In this embodiment the help server 120 enables customized help for a user of the administrator's terminal 110, and optionally to users of the other terminals 115. The help server's memory 165 comprises a help database 180, for example an SQL database, and which comprises predetermined or standardized help content on various help topics associated with various user applications. This predetermined help content is "standard" help content in that it is provided by the developer of a respective user application in order to help a user operate the user application. However the technical abilities of different users will vary markedly, and therefore the standard help content will likely be too simple or not concise enough for some users, but not descriptive enough for other users. The predetermined help content for each user application stored in the help database 180 may be updated periodically by downloading or synchronizing content from a respective external help web server 130 provided by each respective user application provider. The predetermined help content may be stored and indexed in the help database 180 against its respective user application, keywords, topics or in many other ways which will be readily available to those skilled in the database arts. The predetermined help content is non-editable by the user of the first or second user terminals 110, 115.

The help database 180 also comprises user notebook entries which are provided by a user of the administrator's terminal 110. These user notebook entries allow a user to add, edit and review their own content on various help topics. For example a technically proficient user may include a brief customized description of steps required in order to perform some operation within one of the user applications—adding a new user terminal 115 to the WLAN (110, 115, 120, 105) for example. This customized description provided in a user notebook entry may be much more concise than the standard or predetermined help content provided for this operation, and therefore saves the user time. Alternatively or additionally, the user may include additional customized help content such as extra text or figures from, or just a link to, an external website, online notice-board, or online chat-room. The user may include solutions to likely problems, how the problem was previously solved, or even simply a simple set of steps to perform. These user notebook entries are related to the predetermined help content stored in the database 180, for example by using a common help identifier.

The memory 165 and processor 185 of the local help server 120 also provide a server help interface module or layer 175 which is used to search for and access content within the help database 180, and a server presentation module or layer 170 which generates presentation files for transmitting or sending to the user terminals 110, 115 using help content retrieved by the help server interface module 175. The server presentation module may be implemented using an XHTML (extensible hypertext markup language) web based presentation layer 170 together with a CSS (cascading style sheets) presentation layout package. The help server interface module 175 may be implemented on an ASP.NET development framework using suitable scripting which allows the XHTML layer to connect securely with the SQL database. Alternatively other markup languages could be used such as HTML or XML. Other style sheet languages could also be used such as XSL or DSSL, and alternative website development frameworks could be used. Similarly, a different architecture could be used for the help server 120 instead of the database, interface and presentation modules, for example simply a set of HTML pages arranged into a navigable tree structure for the non-editable help content.

The help database 180 and help server interface module 175 are arranged to restrict editing of the standardized or predetermined help content to updating from a respective external website 130, and not to allow editing by users of the terminals 110, 115. However the users are able to create new and edit existing user notebook entries, although editing of user notebook entries may be restricted to the user who created the user notebook entry, or to users of certain terminals for example the administrator's terminal 110 but not a user of the other terminal(s) 115.

As mentioned previously, the customized help functionality provided by this system 100 may be provided using a different system architecture. For example the help database 180 may be provided within one of the user terminals 110 or 115, or on an external web server (not shown). The skilled person will appreciate that various other alternative system architectures will also be possible.

Figure 2:
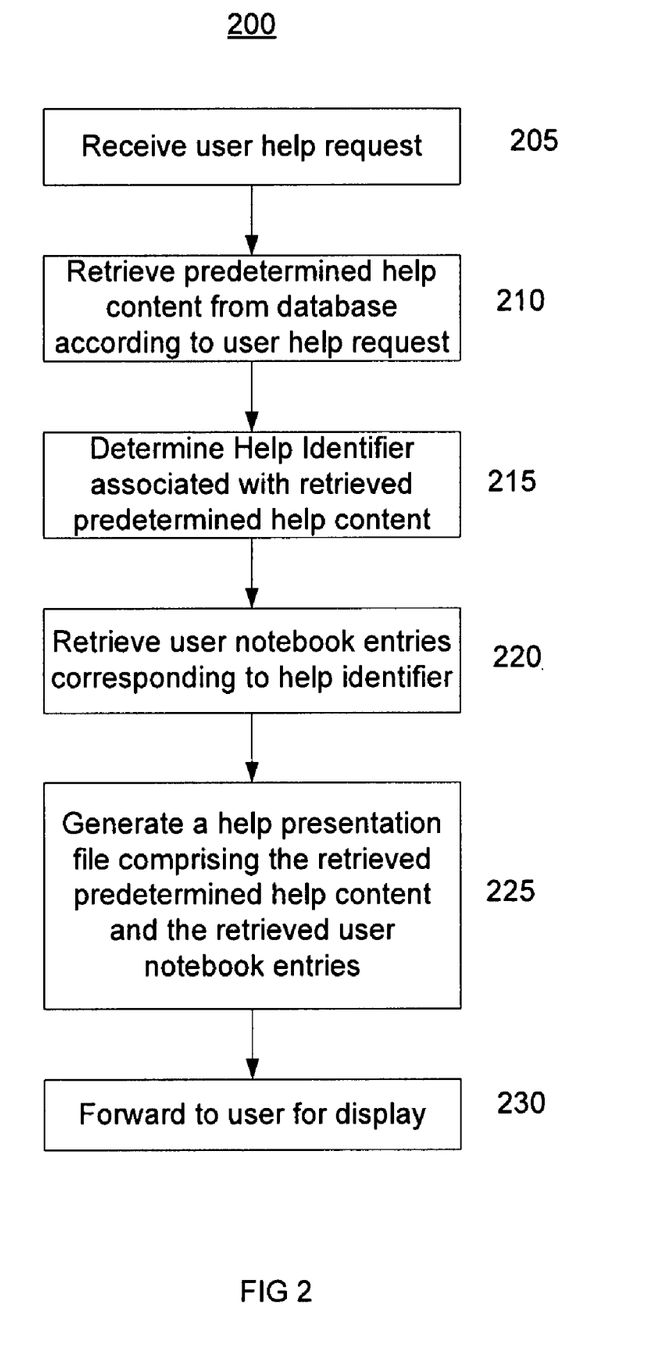
FIG. 2 is a flow chart of a method of providing customized help according to one embodiment.

FIG. 2 illustrates a method 200 including various steps that may be performed in providing custom help. The following description of FIG. 2 is made with reference to the system 100 of FIG. 1. In particular, the description of FIG. 2 is made with reference to the help server 120 of FIG. 1. However, it should be understood that the method described with respect to FIG. 2 is not intended to be limited to being performed by the help server 120 or in system 100. Additionally, it should be understood that while the method 200 indicates a particular order of steps, in other implementations the steps may be ordered differently. Similarly, methods according to other embodiments need not be restricted to the specific steps described with respect to FIG. 2. The method 200 according to FIG. 2 provides customized help for a user of a terminal first user 110 and/or a second user terminal 115, and is implemented on the help server 120. The help server receives a help request at step 205. This help request may be in the form of an HTTP, FTP, TSL/SSL or other message of predetermined format from the Browser or user help interface modules 145 or 150 to the server help interface module 175. The message may include a keyword entered by the user in a help screen associated with a user application such as a word processing package or a wireless network configuration tool. The message may include alternative or additional help indications such as a link or reference to a specific help topic activated by the user using a mouse click for example on a hypertext link or topic identifiers associated with a link in one of a series of navigable and integrated help web pages associated with the user application. Enhanced help screens may be provided using the user help interface 150, however use of the standard help screens for a user application are adequate for this embodiment. Thus for example this embodiment may be implemented on the other terminals 115 without the use of a user help interface 150. Help request messages from the user application are simply forwarded directly to the help server interface module 175 instead of an external help web site provided by the user application's provider. The help server interface module 175 is configured to recognize these help request messages and if necessary to convert them to another format suitable for use with the help database 180. Thus the help content of the user application help screens may be provided fully or at least partially from the standardized or predetermined help content from the help database 180.

The help server 120 then retrieves predetermined help content from the help database 180 in accordance with the user help request at step 210. This step may be achieved by searching the standardized or predetermined help content associated with the current user application in the database 180 for a keyword provided in the help request, or for content corresponding to topic identifiers or a hypertext link provided in the help request.

The help server 120 then determines a help identifier associated with the retrieved predetermined help content at step 215. This help identifier is typically part of the metadata for each help content stored on the help database, whether predetermined help content or user notebook entries, and may be provided in any logical manner known to the skilled person in order to associate or relate predetermined help content to user notebook entries. This associating of predetermined help content and user notebook entries can be done automatically during entry of the user notebook entries, or by independent user action as described in more detail below. The help server 120 then retrieves user notebook entries having the same help identifier at step 220. This step can be achieved by the help server interface module 175 searching the help database 180 for any records having the determined help identifier. The predetermined help content retrieved in response to the user help request and the associated user notebook entries retrieved using the determined help identifier of the retrieved predetermined help content, can then be passed to the server presentation module 170. In the case of a large number of user notebook entries, the method may retrieve a sub-set of these user notebook entries. For example the first ten user notebook entries retrieved from the help database 180, the ten most recently added or edited user notebook entries, or the ten most viewed user notebook entries, and which also correspond to the determined help identifier(s).

The help server 120 then generates a help presentation file comprising both the retrieved predetermined help content and the retrieved user notebook entries at step 225. This step may be implemented at the server presentation module 170 using an XTML/CSS software layer or module which takes the retrieved predetermined help content and user notebook entries from the help server interface module 175 and arranges this using suitable CSS style sheets as is known. Thus when rendered on the browser module 145 for example, the predetermined help content and user notebook entries will be displayed in an integrated manner showing both sets of content in a suitable layout. Thus the retrieved predetermined content and the retrieved user notebook entries may be displayed adjacent each other in a common screen display. The generated presentation file is then forwarded to the first or second user's terminal 110 or 115 at step 230, for example using another message for example having HTTP, FTP or SSL formats. The browser module 145 then receives and displays the presentation file in any suitable manner which would be apparent to the skilled person.

Figure 3:
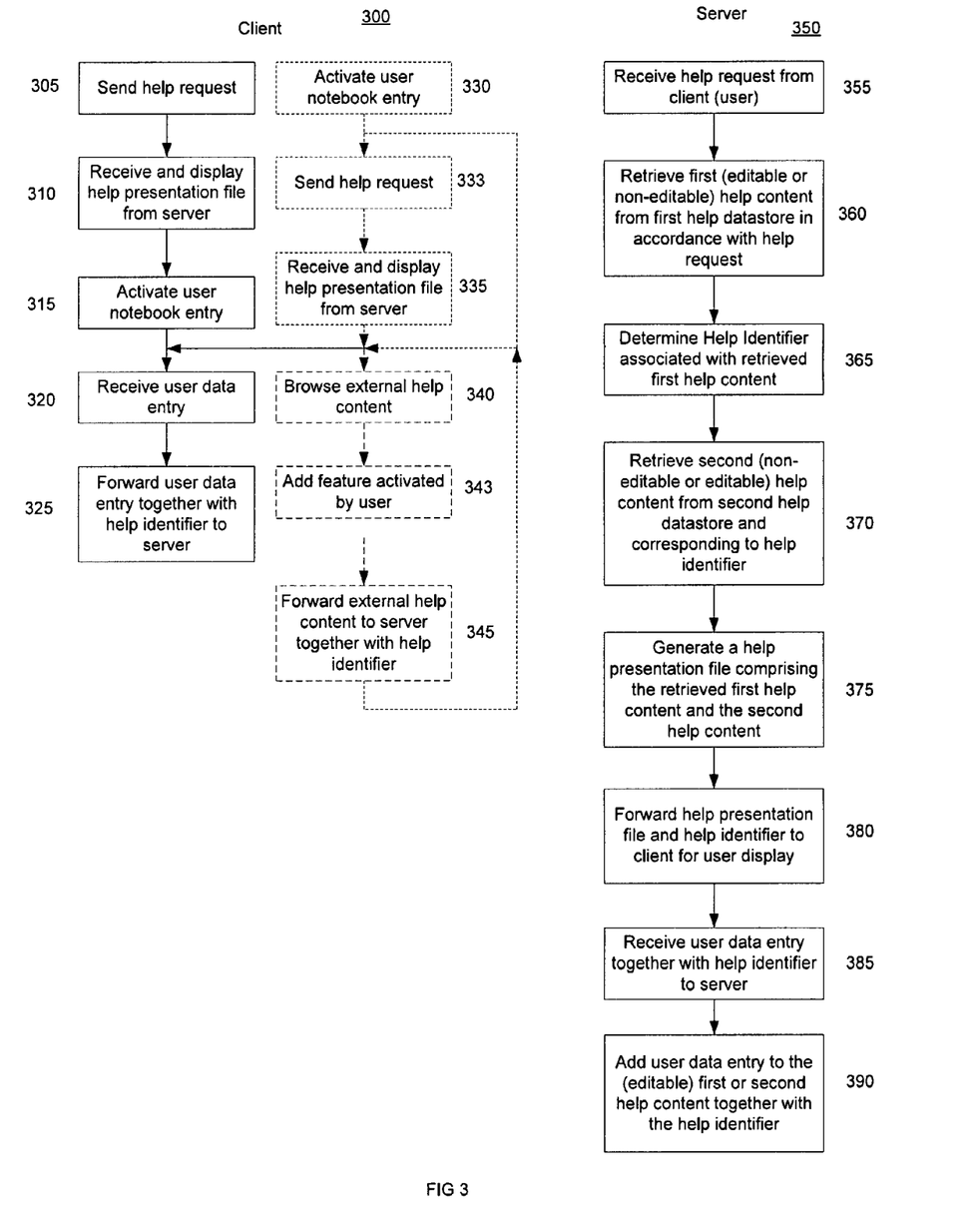
FIG. 3 is a flow chart of a method of providing customized help and customizing standard help according to one embodiment.

FIG. 3 illustrates a client method 300 including various steps that may be performed in providing custom help. The following description of client method 300 is made with reference to the system 100 of FIG. 1. In particular, the description of client method 300 is made with reference to the first user terminal 110 of FIG. 1. However, it should be understood that the client method 300 is not intended to be limited to being performed by the first user terminal 110 or in system 100. FIG. 3 also illustrates a server method 350 including various steps that may be performed in providing custom help. The following description of server method 350 is made with reference to the system 100 of FIG. 1. In particular, the description of server method 350 is made with reference to the help server 120 of FIG. 1. However, it should be understood that the server method 350 is not intended to be limited to being performed by the help server 120 or in system 100. Additionally, it should be understood that while the client method 300 and the server method 350 each indicate a particular order of steps, in other implementations these steps may be ordered differently. Similarly, client or server methods according to other embodiments need not be restricted to the specific steps described with respect to FIG. 3. The client method 300 according to FIG. 3 may be implemented on the administrator terminal 110 by the help user interface module 150. The help user interface module 150 initially sends a help request at step 305. The help request may include a keyword or topic identifier as previously discussed, and may be received from a user interacting with the help user interface module 150, the user application help screens or the browser module 145. The help user interface module 150 may provide a custom help screen, or the browser module 145 may provide a standard help screen for the user application. The help user interface module 150 may be integrated with the browser 145, for example as a plug-in, so that these two modules may exchange user entries and other received data as is known.

The user interface module 150 then receives and displays a help presentation file at step 310. The help presentation file is received from the help server 120 as previously discussed, and typically includes a help identifier.

The user help interface module 150 then activates a user notebook entry at step 315, for example in response to user activation of an onscreen control button. This step may be implemented by the help user interface module 150 opening a user entry window or screen region in which to receive user data entry. The method 300 then receives user data entry at step 320, which may be displayed in a user notebook entry window. The user data entry may comprise text, drawings, highlights of the predetermined help content, or help content copied from an external website or a link such as a hypertext link to that help content, or any other data which may be entered or linked to by the user. The method 300 then forwards the user data entry to the help server 120 at step 325. This step may be implemented using a user data entry message in any suitable format such as HTTP, and which includes the user data entry together with the help identifier sent with the help presentation file in step 310.

The server method 350 corresponds largely to the method 200 shown in FIG. 2. The server method 350 may be implemented in the help server 120 on the help database 180, the help server interface module 175, and the server presentation module 170. The help server interface module 175 receives a user help request from the client at step 355. This follows the send user help request step 305 of the client method 300. The help server interface module 175 then retrieves first help content from a first help datastore in accordance with the help request at step 360. The first help content may be the editable user notebook entries or the non-editable predetermined help content previously described. However other first help content could alternatively be used. The first help datastore in this embodiment is the help database 180. A help identifier associated with the retrieved first help content is determined at step 365, for example querying metadata in the help database 180 which is associated with the retrieved first help content. Second help content corresponding to this help identifier are also retrieved from a second help datastore at step 370. The second help content may be the non-editable predetermined help content or the editable user notebook entries previously described, and is different from the first help content. The second help datastore in this embodiment is also the help database 180; however the first and second help datastores could alternatively be implemented separately. The server presentation module 170 then generates a presentation file comprising the retrieved predetermined help content and user notebook entries, as well as the help identifier. The help presentation file is forwarded to the client at step 380 of the server method 350, and received at step 310 of the client method 300.

The server presentation module 170 then receives user data entry together with a help identifier at step 385. This user data entry was sent from the user terminal 110 at client method step 325. The help server interface module 175 then adds this user data entry to the help database at step 390. The database record containing this user data entry is a user notebook entry in this embodiment and is associated with or indexed against the help identifier received with the user data entry. This allows the new user notebook entry to be retrieved the next time predetermined help content records associated with the help identifier are retrieved, for example in response to a new user help request.

As an example of an application of these methods (300, 350), a user wishing to configure a WLAN for the first time may use a keyword and/or a topic identifier in help requests in order to identify relevant predetermined help content. This predetermined help content may then be customized by the user by adding user notebook entries which are associated with the predetermined help content identified by the user for this specific task. For example the user may include a simple set of steps or key entries on a notepad attachment. Then the next time the user searches for WLAN configuration help, the presentation file returned will include the user notebook entries (the notepad) as well as the predetermined help content. This allows the user to configure a new WLAN much more quickly than the first time they tried this without the user notebook entries.

The help user interface 150 may be configured to allow user editing of existing user notebook entries, for example in order to update or correct these. The edited user notebook entries will then either be forwarded to the help server 120 where they will overwrite or edit the existing user notebook entry in the database 180.

Figure 4:
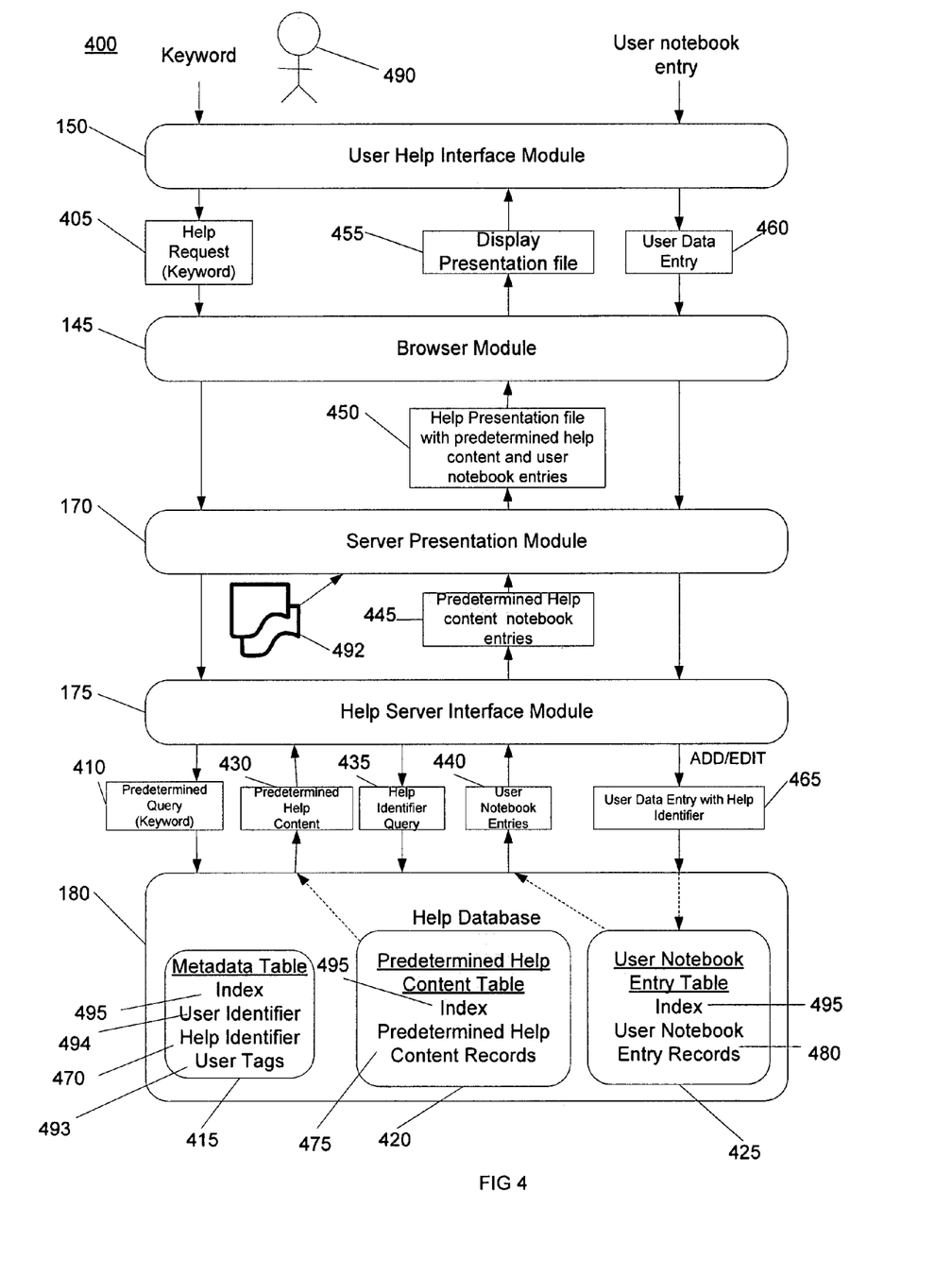
FIG. 4 illustrates signal and data flow between component parts of an embodiment.

FIG. 4 illustrates the flow of signals and data between the client (110, 145, 150) and the server (120, 170, 175, 180) according to an example embodiment. Reference is also made to apparatus and method steps in FIGS. 1, 2, and 3, however it will be appreciated that alternative signal and data flows could be used. The user help interface module 150, browser module 145, server presentation module 170, help server interface module 175, and help database 180 are illustrated. The help database 180 of this embodiment comprises a query-directed relational database comprising at least a metadata table 415, a predetermined help content table 420, and a user notebook entry table 425. The predetermined help content and user notebook entry tables 420 and 425 comprise predetermined help content records 475 and user notebook entry records 480 respectively, together with respective indexes 495 linking them to the metadata table 415. The metadata table 415 includes various metadata for each predetermined help content or user notebook entry record, including a help identifier 470. Links to other tables used for keyword searching or help topic identifiers may also be included for the predetermined help content records 475 and/or the user notebook entry records 480. This simple database architecture is described for explanatory purposes only, and the skilled person will be aware of other suitable architectures which could alternatively be used.

In response to action by a user 490, such as actuating a help control on a user application or directly within the help user interface module 150, the help user interface module 150 receives a keyword, help topic link or other help indication from the user. This help indication is provided by the user help interface module 150 as a help request 405 in a predetermined message format and which is forwarded to the help server interface module 175. The help server interface module 175 retrieves the keyword or other help indication from the help request message 405 and uses this to formulate a predetermined query 410, for example an SQL query, for the help database 180. The help database may incorporate database management software which queries the database records according to the predetermined query 410. Predetermined help content from the database and matching the predetermined query 410 is returned to the help server interface module 175. This retrieved predetermined help content 430 may be a sub-set of the predetermined help content records 475 stored in the predetermined help content table 420, or help content data items from those records 475. The help server interface module 175 then determines the help identifier 470 associated with the retrieved predetermined help content 430, for example by querying the help database 180 again for help identifiers matching the returned predetermined help content records. Alternatively the predetermined query 410 may have requested the help identifiers as well as the predetermined help content matching the user provided keyword or other help indications. The help server interface module 175 then queries the help database again with a help identifier query 435 for all user notebook entries which match the determined help identifier 470. The database 180 returns user notebook entry records or data items to the help server interface module 175 which match the determined help identifier(s). These retrieved user help entries 440 may be a sub-set of the user notebook entry records 480 or user notebook entry data items from those records 480. Combined data 445 containing the retrieved user notebook entry records 440, the retrieved predetermined help content records 430 and the help identifier(s) 470 are then passed to the server presentation module 170.

The server presentation module 170 uses this combined (predetermined help content and user notebook entries) data 445 to generate a help presentation file 450, using the help content from the combined data 445 and layout data from style sheets 492. Any suitable style sheets and style sheet language may be used such as XML for example. The help presentation file 450 containing the XML data together with the help identifiers is then forwarded to the browser module 145 in the user terminal 110 where it is displayed to the user. Alternatively this help presentation file 450 may be passed to the help user interface module 150 for enhanced presentation or user interfacing facilities.

Any user entries from the user 490 into the help user interface module 150 are sent as user data entry 460 to the help server interface module 175. The help server interface module 175 then formulates the user data entry into a suitable add or edit command 465 which is passed to the database 180 and entered into a suitable user notebook entries record 480.

Figure 5:
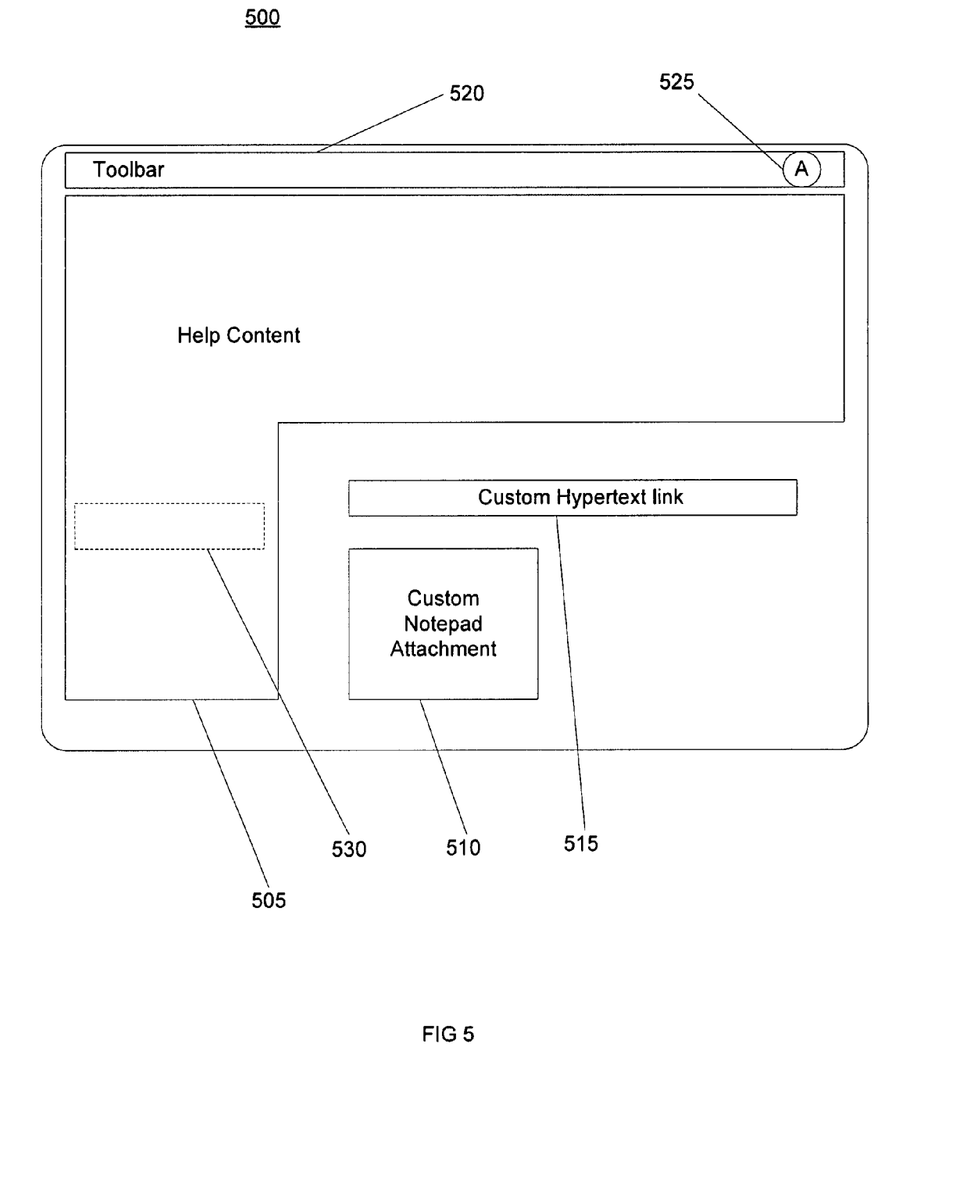
FIG. 5 illustrates a display screen of customized help according to an embodiment.

FIG. 5 illustrates an example help screen 500 generated by the user help interface module 150, and which includes the non-editable predetermined help content 505 as well as editable user notebook entries 510, 515, 570 which are displayed adjacent the predetermined help content 505. The editable user notebook entries include in this example a custom notepad 510 comprising user text, a custom hypertext link 515 to an external website with relevant help content, and a highlight bar 530 over a block of text in the predetermined help content. The help screen 500 may also include a toolbar 520 providing special functions buttons, one of which is described below.

Whilst a user help interface module 150 is employed on the administrator's terminal 110 in this embodiment, this may be omitted on other terminals 115 which do not have the ability to edit or add user notebook entries. In this case, the browser module 145 of the other or second user terminal 115 may be used to display a help page and forward help requests to the help server interface module 175, and to display the returned presentation file. The server 120 still follows the method 200 of FIG. 2, and the presentation file 450 may include user notebook entries 510, 515, 530 related to the predetermined help content 505 retrieved by the help request. Thus, a user of the other terminals 115 may view the customized help content (505, 510, 515, 530) rather than only the predetermined help content (505), but is not able to edit or add user notebook entries.

In alternative embodiments, the help requests may cause the initial retrieval of matching user notebook entries instead of predetermined help content, for example those matching a keyword or specific help topic. The help server interface module 175 then determines the help identifiers of the retrieved user notebook entries (440), and retrieves predetermined help content (430) having the same help identifier(s). The combined user notebook entries and predetermined help content 445 is then used as with the previous embodiment to generate a help presentation file 450 for display to the user. Thus embodiments can retrieve first help content (editable user notebook entries or non-editable predetermined help content) in response to the help request, for example a keyword or specific link to a help topic of content. These embodiments can then determine a help identifier associated with this first help content, and retrieve second help content (the corresponding predetermined help content or user notebook entries) having the same help identifier. The combined first and second help content (predetermined help content and user notebook entries) are then used to generate a help presentation file which is forwarded to a user for display. One of the first or second help content, the predetermined help content, is not editable by the user, whereas the other help content, the user notebook entries, are editable by the user. Thus the two help content parts, predetermined help content and user notebook entries, are linked by respective help identifiers so that retrieving one of these help content parts will also cause the retrieval of the other help content part.

Further customization of the help content provided to the user may be implemented in one or more embodiments using user tags 493 with the predetermined help content (475). For example, in addition to the use of help identifiers 470 for the predetermined help content 475 and the user notebook entries 480, users may tag certain predetermined help content records 475 as being relevant to another help topic. For example a user trying to configure a WLAN may, in addition to specific WLAN configuration predetermined help content, have found specific authentication predetermined help content useful for completing the WLAN configuration task. In this case, a user might add a custom link (515) to authorization predetermined help content (475) into a user notebook entry (480) for WLAN configuration. Alternatively, or in addition, the user may be given the facility to tag (493) the authorization predetermined help content record 475 with the help identifier 470 associated with the WLAN configuration predetermined help content, thus customizing the metadata 415 of the help database. Then the next time the server is retrieving predetermined help content relating to WLAN configuration, it will also be arranged to retrieve any other predetermined help content (475) tagged (493) with the same help identifier.

The help database 180 may also include user identifiers 494 where user notebook entries are stored for a number of different users. Thus each user will be provided with their own customized help, though based on the same predetermined help content 475. For example where the first and second user terminals 110 and 115 are configured to add/edit user notebook entries, these can be distinguished by respective user identifiers 494. Then when the help server interface module 175 is querying user notebook entry records 480 which match a determined help identifier 470, the help identifier query 435 may also be required to match a user identifier 494 corresponding to one of a number of users. The user identifier 494 may be included with the help request from the respective user terminal. Thus a sub-set of the user notebook entries matching the help identifier 470 will typically be retrieved.

In alternative embodiments, the help server may be located remote from the user terminals 110, 115, for example coupled via the Internet. Similarly, in addition to predetermined help content supplied via an external help website 130 by a user application provider, the help database 180 may also download predetermined help content from a publicly updated website dedicated to help content on respective help topics. For example this publicly edited content may be provided on a wiki (What I Know Is) site which members of the public may edit, or as part of an online group message board and so on. Where the wiki articles are rated by users of the wiki site, the help server may be arranged to only download content from wiki articles having a rating above a set threshold in order to limit their number and/or irrelevance for example.

In alternative embodiments, the user notebook entries may be stored locally on the user terminal 110 together with respective help identifiers. Then when the help server 120 retrieves predetermined help content in response to a help request, a modified help user interface (150) searches locally for user notebook entries corresponding to the help identifier of the retrieved predetermined help content, then generates and displays a help presentation file with the combined help content.

An alternative embodiment is described with respect to the broken line method steps of FIG. 3. Instead of sending a help request (305), a user help interface module 150 following this client method 300 activates user notebook entries at step 330. The user notebook entries are stored in the help database 180 and may be associated with a high level index or "table of contents" referring to more detailed content within the other user notebook entries. The user notebook entries may be browsed by selecting a suitable help topic or by provision of a search keyword by the user. This results in a help request being sent to the server at step 333. This user help request is however based on initially searching and retrieving the user notebook entries 480 at the help server 120, instead of the predetermined help content 475 as described previously. In some configurations, the help user interface module 150 or client method 300 may be configured to send a limited help request which just returns either corresponding predetermined help content or corresponding user notebook entries, but not both combined. Such a feature may be provided in a toolbar 520 of a user help interface module generated screen 500. Another such toolbar feature may provide for the retrieval of any help content part (user notebook entries 440 or predetermined help content 430) related to the help content part (predetermined help content 505 or user notebook entries 510, 515, 530) currently displayed on the help screen 500. Any help content provided by the help server, typically using a help presentation file, is then received and displayed by the client at step 335.

Alternatively, an empty user notebook entry may be provided at step 330, allowing the user to generate a first new user notebook entry for adding to the help database 180. Whether a new user notebook entry is created, or user notebook entries corresponding to a help request are received and displayed (335), the client method 300 may then revert to receiving user data entry at step 320. Any received user data entry can then be forwarded to the help server (325) for adding to the help database 180 as previously described.

Alternatively or additionally, the user may be allowed to browse external help content at step 340. The external help content may be located on a website or a CD-ROM for example. An automated addition feature may be included in the toolbar 520 of a help screen 500 provided by the help user interface module 150. This may be activated by a user by actuating a button 525 embedded within the toolbar 520. When an actuation signal is received at step 343, the currently displayed external help content or a link to this external help content is copied into a user notebook entry. This user notebook entry is then forwarded to the help server at step 345 for adding to the help database on the help server 120. This user notebook entry may be associated with a help identifier assigned by the user, for example from a drop-down menu or list. Alternatively, if the user notebook entry has been activated in response to retrieved predetermined help content (step 315), then the help identifier of the retrieved predetermined help content will be automatically associated with the new user notebook entry.

Figure 6:
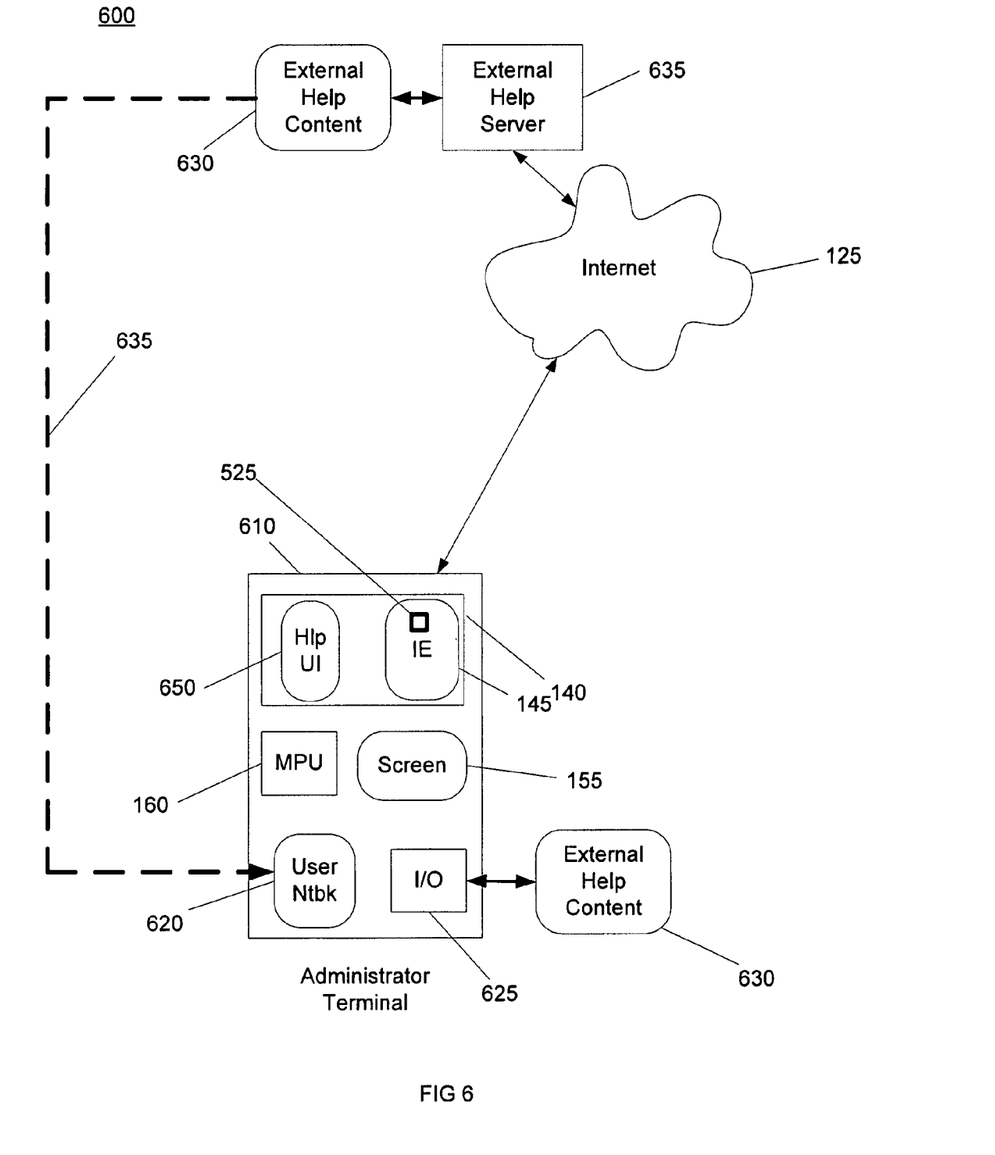
FIG. 6 is a schematic of an operating environment for an embodiment.

A further example embodiment is described with respect to FIG. 6. Here a user help system 600 comprises an administrators terminal 610 and an external help server 635 coupled by the Internet 125. The terminal 610 is similar to the terminal 110 of FIG. 1, including a microprocessor 160, memory 140, and a display screen 155. The user terminal 610 also includes locally stored user notebook entries 620, a modified help user interface module 650 and an input/output interface 625. The embodiment does not use a remote help database storing non-editable predetermined help content together with editable user notebook entries, but instead locally stores user notebook entries which may store help content retrieved from external help content sources, or links to these external sources, as well as user provided user notebook entries as previously described. Referring also to FIG. 3, the user help interface module 650 allows (at step 340) a user to browse external sources of help content 630 including for example an external help server 635 or CD-ROMS 630. Upon actuation of a user add feature (525), the currently viewed external help content is automatically added to the currently open user notebook entry (step 343). Instead of then sending this user notebook entry to a help server for adding to the help database as previously described, this user notebook entry is stored in the locally stored user notebook entries 620. The user notebook entries may be arranged into a structured help notebook comprising topics and a navigable architecture. The newly added external help content may then be easily found the next time the user is browsing the same help topic area of the user notebook entries.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method for providing customized help, the method comprising:

retrieving a first help content from a first help datastore in response to a help request received from a user, the first help datastore storing a plurality of help content each associated with a respective help identifier;

retrieving a second help content from a second help datastore, the second help datastore storing a plurality of help content each associated with a respective help identifier, the second help content having the same help identifier as the first help content;

generating a help presentation file comprising the first help content and the second help content;

wherein the first help datastore is editable by the user and the second help datastore is non-editable by the user;

presenting the help presentation file on a user display;

presenting a user input mechanism on the user display;

capturing user generated help content with the user input mechanism;

storing the user generated help content in the first help datastore; and receiving and identifying a user selected help content selected through the user input mechanism, the user selected help content coming from the first help datastore and adding the user selected help content to the second help datastore with the respective help identifier.

2. The method according to claim 1, wherein the help content stored in the first and second datastores are stored in a common database.

3. The method according to claim 2, wherein the first and second help content are stored in respective records in the common database and the generating the help presentation file comprises importing the first and second help content into predetermined style sheets.

4. The method according to claim 1, wherein the first help datastore stores predetermined help content which is non-editable by the user and the second help datastore stores user notebook entries which are editable by the user.

5. The method according to claim 1, said second help datastore being locally stored.

6. The method according to claim 1, further comprising adding a new help content to the help datastore which is editable by the user in response to user data entry received from the user, and associating the new help content with the help identifier associated with the first and second help content.

7. The method according to claim 1, further comprising editing an existing help content in the help datastore which is editable by the user in response to user data entry received from the user.

8. The method according to claim 1, wherein the first and second help datastores are stored on a help server and the help request from the user comprises a keyword associated with or a link to the retrieved first or second help content.

9. The method according to claim 1, wherein the help request is received from a user terminal and the presentation file is sent to the user terminal.

10. The method according to claim 9, wherein a second help request is received from a second user terminal, and wherein both the first and second help datastores are non-editable by the second user.

11. The method according to claim 6, wherein the user data entry comprises one or a combination of: user entered content; a link to external help content; external help content.

12. The method according to claim 1, wherein the presentation file is rendered with the retrieved first and second help content appear adjacent in a common screen display.

* * * * *